3,014,927
MONOESTERS OF TETRAHYDROFURAN GLYCOL
John D. Garber, Westfield, Robert E. Jones, Rahway, and Samuel A. Robinson, Scotch Plains, N.J., assignors to Merck & Co., Inc., Rahway, N.J., a corporation of New Jersey
No Drawing. Filed Oct. 5, 1960, Ser. No. 60,553
6 Claims. (Cl. 260—347.4)

This invention relates to the monoesters of 5-hydroxymethyl furfural (HMF) and has for its object the reduction of such monoesters to provide a class of monoesters of 2,5-tetrahydrofurandimethanol.

This application is a continuation-in-part of our pending application, Serial No. 760,058, filed on September 10, 1958, now abandoned.

The compounds of the invention may be represented by the formula:

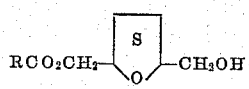

in which R represents an aliphatic radical having from 1 to 18 carbon atoms, and by the formulae:

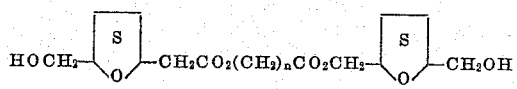

and

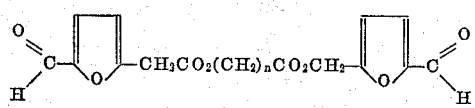

in which $n$ varies from 1 to 10.

The saturated monoesters of this invention are useful as selective solvents as in the separation of aromatic hydrocarbons from naphthenic or aliphatic hydrocarbons. For example, aqueous solutions of the monoacetate of 2,5-tetrahydrofuran dimethanol will effect the separation of toluene from N-heptane. By varying the chain lengths of the monoesters of the 2,5-tetrahydrofurandimethanol it is possible to vary the solubility in water and hydrocarbons and hence the solvent properties thereof as compared to the parent glycol. In addition, the higher alkyl monoesters of 2,5-tetrahydrofurandimethanol such as 2,5-tetrahydrofurandimethanol monolaurate and 2,5-tetrahydrofurandimethanol monooleate are useful as wetting agents. Also, the sodium sulfate esters of the higher alkyl monoesters of the 2,5-tetrahydrofurandimethanol are valuable wetting agents and are therefore useful in wetting agent compositions. The higher alkyl esters of 2,5-tetrahydrofurandimethanol such as 2,5-tetrahydrofurandimethanol monolaurate show moderate corrosion inhibition properties for carbon steel. Thus, a sample of carbon steel, when exposed to an environment of brine, will corrode to a much lesser extent if the brine contains a higher alkyl ester of 2,5-tetrahydrofurandimethanol.

The unsaturated monoesters are valuable intermediates for the production of the saturated monoesters of this invention.

In producing the compounds of this invention, hydroxymethyl furfural may be first converted to unsaturated monoesters. This is done by reacting hydroxymethyl furfural with an acid anhydride or an acyl halide in the presence of a catalyst such as pyridine. For example, to make bis HMF adipate, hydroxymethyl furfural is reacted with adipoyl chloride in the presence of pyridine at a temperature of about 30° C. The reaction temperature may vary from 30° C. up to about 50° C. when an acyl halide is used, and from 80° C. up to 100° C. when an organic acid anhydride is used. The resulting monoesters are then subjected to hydrogenation to form the monoesters of 2,5-tetrahydrofurandimethanol. The hydrogenation is preferably carried out in the presence of a catalyst such as Raney nickel at a temperature in the range of from about 80° C. up to about 200° C. and a pressure of from about 100 p.s.i. up to about 1000 p.s.i. Examples of monoesters of HMF used are HMF acetate, propionate, butyrate and hexanoate derived from their monobasic acids and HMF succinate, adipate and sebacate derived from their dibasic acids. These compounds are formed by reacting such compounds as propionic anhydride, butyric anhydride, hexanoic anhydride, succinoyl chloride, adipoyl chloride or succinic anhydride with hydroxymethyl furfural.

The saturated monoesters of this invention may alternatively be prepared by reacting an excess quantity of 2,5-tetrahydrofurandimethanol with an acyl halide. It is preferable to carry reaction out in the presence of a basic catalyst such as pyridine and an organic solvent which is compatible with the reactants such as tetrahydrofuran.

The preferred procedure is as follows: 2,5-tetrahydrofurandimethanol is first mixed with pyridine and tetrahydrofuran. A second solution of the acyl halide in tetrahydrofuran is then added slowly to the solution containing the 2,5-tetrahydrofurandimethanol. The temperature of the reaction mass is preferably kept below 15° C. The mixture is then stirred for a period of from 5 up to about 20 hours. The product, the monoester of 2,5-tetrahydrofurandimethanol, is then separated from the reaction mass as by extraction with a solution of sodium chloride in water. The desired product remains in the non-aqueous phase, which may be subsequently purified as by degasification and/or distillation under reduced pressure.

The following examples illustrate the preparation of monoesters of HMF:

Example 1

To 50 g. HMF dissolved in 69 g. butyric anhydride was added 3 ml. pyridine and the whole heated one hour at 90–100° C. The excess anhydride was removed by distillation. The product, HFM butyrate, was then distilled at a temperature of 79–87° C. and a pressure of 0.060 mm. Hg. The product had a refractive index at 25° C. of 1.5023.

|  |  | Calc. | Found |
|---|---|---|---|
| Analytical data on semicarbazone | C | 52.20 | 52.50 |
|  | H | 5.98 | 5.95 |
|  | N | 16.60 | 16.92 |

Example 2

The run described in Example 1 was repeated using 56 ml. of propionic acid anhydride (56.6 g., 0.436 mol). The crude yield was 100% of red liquid $n_D{}^{25}=1.5000$; the distilled product, HMF propionate, was a pale yellow-green liquid, $n_D{}^{25}=1.5090$, B.P.=84–86° C. at 0.1 mm.

|  |  | Calc. | Found |
|---|---|---|---|
| Analytical data on semicarbazone | C | 50.30 | 50.54 |
|  | H | 5.48 | 5.30 |
|  | N | 17.58 | 17.85 |

Example 3

To 50 g. (0.396 mol) HMF dissolved in 100 ml. dry pyridine was added with stirring and cooling, 71.8 g. (0.44 mol) of 2-ethyl hexanoyl chloride, also dissolved in 100 ml. of dry pyridine. The reaction mixture was aged for 60 minutes at 30° C. and quenched in 500 ml. H₂O. After extraction with ethyl ether, washing, drying and decolorizing with Nuchar C1000 N, the yield of dark oil was 98%, $n_D^{25}=1.4822$. Distillation of a portion at 0.13 mm. and 102–104° C. gave the product, HMF 2-ethyl hexanoate, a yellow oil. The product had a refractive index at 25° C. of 1.4853.

|  | Calc. | Found |
|---|---|---|
| Analytical data on semicarbazone C | 58.30 | 58.12 |
| H | 7.47 | 7.20 |
| N | 13.59 | 13.75 |

Example 4

Fifty grams of HMF (0.396 mol) and 44 g. of succinic anhydride (0.44 mol) were heated in 200 ml. dry pyridine at 95° C. for 30 minutes. An oily residue was formed upon removal of the solvent at 15 mm. Hg pressure. To this was added 75 ml. of 2.5 N HCl; and after chilling 65.4 grams of yellow solid, HMF acid succinate, M.P. 89–90° C., equivalent weight=213 (theory=226) was formed.

|  | Calc. | Found |
|---|---|---|
| Analytical data on semicarbazone C | 46.17 | 47.10 |
| H | 4.63 | 4.78 |
| N | 14.86 | 14.65 |

Example 5

The run described in Example 3 was repeated using adipoyl chloride (34.8 g., 0.19 mol) to yield a crystalline solid, M.P. 91–92.5° C., which by analysis was shown to be the bis HMF adipate.

|  | Calc. | Found |
|---|---|---|
| Analytical data on semicarbazone C | 50.61 | 50.67 |
| H | 5.07 | 4.68 |
| N | 17.65 | 17.53 |

Example 6

By a procedure similar to that used in Example 5, bis HMF sebacate was prepared from HMF and sebacoyl chloride in 90% yield. The crude product was a crystalline solid, M.P. 92–97° C.

The following examples illustrate the preparation of the saturated monoesters of 2,5-tetrahydrofurandimethanol represented by the formula:

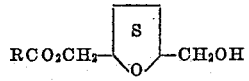

Example 7

HMF acetate may be prepared by the process described by Karashima, Chemical Abstracts, vol. 23, p. 2175.

200 g. of HMF acetate was dissolved in 1600 ml. of diethylether and 30 g. of Raney nickel catalyst was added. The solution was hydrogenated at 100° C. at 200 p.s.i. The catalyst was removed by filtration, and the filtrate was fractionated giving 113 g. of pure 2-hydroxymethyl-5-tetrahydrofurfuryl-acetate. The liquid product boiled at 94–98° C. at 0.03 mm. and showed a refractive index at 25° C. of 1.455.

|  | Calc. | Found |
|---|---|---|
| C | 55.14 | 55.25 |
| H | 8.10 | 7.93 |

Example 8

A solution of 91.0 g. (0.50 mol) of HMF propionate, produced by the process of Example 2, in 700 ml. ethyl ether was hydrogenated over 10 g. Raney nickel at 150° C. and 1000 p.s.i.g. The catalyst was filtered, washed with methanol, and the solvent removed.

The product, 2-hydroxymethyl-5-tetrahydrofurfuryl propionate, weighed 88.4 grams (94%), $n_D^{25}=1.4471$. Distillation of a portion was accomplished at 92–94° C. (0.080 mm.), $n_D^{25}=1.4530$, $d^{25}=1.099$ g./ml. and no unexpected absorption by infrared. The analytical data for 2-hydroxymethyl-5-tetrahydrofurfuryl-propionate follow:

|  | Calc. | Found |
|---|---|---|
| Analytical data on semicarbazone C | 57.45 | 56.93 |
| H | 8.57 | 8.75 |

Example 9

A solution of 40.0 g. (0.202 mol) of HMF butyrate as produced in Example 1 was hydrogenated at 150° C./1000 p.s.i.g. over 3 teaspoons Raney nickel in 300 ml. ethyl ether. Removal of catalyst and solvent gave nearly a theoretical yield of monoester, 2-hydroxymethyl-5-tetrahydrofurfuryl butyrate, $n_D^{25}=1.4463$. Distillation at 85–91° C./0.150 mm. gave a water white product, $n_D^{25}=1.4535$. Analytical data based on 2-hydroxymethyl-5-tetrahydrofurfuryl butyrate are as follows:

|  | Calc. | Found |
|---|---|---|
| C | 59.50 | 59.67 |
| H | 8.98 | 8.88 |

Example 10

2-hydroxymethyl-5-tetrahydrofurfuryl-(2)-ethylhexanoate was prepared from the corresponding HMF ester, which was produced by the process of Example 3. 69.0 g. (0.274 mol) of HMF-2-ethylhexanoate were reduced over 7.5 g. Raney nickel in 500 ml. ethyl ether at 150° C./1000 p.s.i.g. Work-up yielded 96 percent of crude 2-hydroxymethyl-5-tetrahydrofurfuryl-2-ethylhexanoate, $n_D^{25}=1.4512$. Distillation of this product at 0.15 mm. (109–110° C.) yielded a compound having a refractive index at 25° C. of 1.4558.

The following examples represent the preparation of the monoesters of 2,5-tetrahydrofurandimethanol represented by the formula:

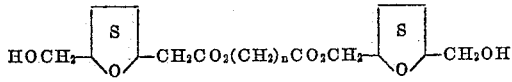

Example 11

19.0 g. (0.089 mol) of the acid succinate of HMF, produced by the process of Example 4, was hydrogenated over 2.0 g. Raney nickel in 200 ml. methanol at 150° C./1000 p.s.i.g. Essentially quantitative yields of the product, 2-hydroxymethyl-5-tetrahydrofurfuryl acid succinate, $n_D^{25}=1.4550$, were obtained. After distillation, 88–98° C. at 0.100 mm., the refractive index showed only a small change, $n_D^{25}=1.4539$.

The same product, 2-hydroxymethyl-5-tetrahydrofurfuryl acid succinate, was prepared by reducing the acid maleate of HMF in the same manner as described above. The final product showed a refractive index of 25° C. at 1.4534.

|  | Calc. | Found |
|---|---|---|
| C | 51.70 | 51.27 |
| H | 6.95 | 6.79 |

Example 12

Bis (HMF) adipate, produced by the process of Example 5, was reduced at 150° C. at a hydrogen pressure of 1000 p.s.i.g. An oily product, bis (2-hydroxymethyl-5-tetrahydrofurfuryl)-adipate, was distilled from the reaction mass at 44–53° C./0.10 mm. and showed $n_D^{25}$ =1.4458. The analytical data for bis (2-hydroxymethyl-5-tetrahydrofurfuryl)-adipate follows:

|   | Calc. | Found |
|---|-------|-------|
| C | 57.80 | 58.04 |
| H | 8.08  | 8.67  |

Example 13

Bis (HMF) sebacate, produced by the process of Example 6, was reduced over Raney nickel at 150° C. at a hydrogen pressure of 1000 p.s.i.g. The crude product, bis (2 - hydroxymethyl - 5 - tetrahydrofurfuryl) sebacate, showed a refractive index at 25° C. of 1.4598.

Example 14

A 10-liter spherical glass vessel fitted with a stirrer was charged with the following mixture:

| | |
|---|---|
| 2,5 tetrahydrofurandimethanol _____gm__ | 1244 |
| Pyridine _____gm__ | 690 |
| Tetrahydrofuran _____cc__ | 2764 |

A second solution consisting of 2764 cc. of tetrahydrofuran and 700 gm. of lauroyl chloride was added to the 10-liter vessel, dropwise, over a period of 5 hours. The temperature of the reaction mass was maintained in the range of 10–15° C. After the addition of the second solution, the resulting mixture was maintained at a temperature of 20° C. for a period of 20 hours, with stirring. The resulting reaction mass was then added to 12 liters of water containing 300 gm. of sodium chloride. The mass then separated into two phases—upper: nonaqueous, lower: aqueous. The upper phase was then separated from the lower phase. The upper phase was then extracted successively with a solution of 1 M HCl, one volume of 5% NaCl solution, one volume of 5% NaHCO$_3$—5% NaCl—90% H$_2$O, and one volume of a 5% NaCl solution. The upper phase was then dried with anhydrous magnesium sulfate. After drying, the upper phase, 2,5 tetrahydrofurandimethanol laurate, was subjected to reduced pressure, thereby removing volatile impurities. The product had the following physical properties:

Specific gravity _____ 0.97
Refractive index at 26° C. _____ 1.4580

Example 15

An experiment similar to that carried out in Example 14 was run with the exception that oleyl chloride rather than lauroyl chloride was used. Thus, 2,5-tetrahydrofurandimethanol oleate was produced. It had the following properties:

Specific gravity _____ 0.95
Refractive index at 26° C. _____ 1.4684

Any departure from the above description which conforms to the present invention is intended to be included within the scope of the claims.

What is claimed is:

1. A compound selected from the class consisting of compounds having the formula

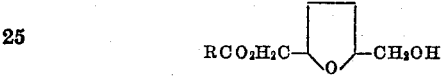

and

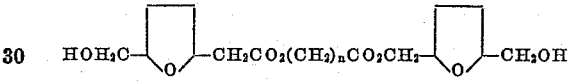

where R is an alkyl radical having from 1 to 18 carbon atoms and $n$ has a value of 1 to 10.

2. A compound having the formula

OC—[THF]—CH$_2$CO$_2$(CH$_2$)$_n$CO$_2$CH$_2$—[THF]—CHO wherein $n$ has a value of 1 to 10.

3. 2-hydroxymethyl-5-tetrahydrofurfuryl acetate.
4. Bis (2-hydroxymethyl-5-tetrahydrofurfuryl)-adipate.
5. 2-hydroxymethyl-5-tetrahydrofurfuryl oleate.
6. Bis (2-hydroxymethyl-5-furfuryl) adipate.

No references cited.